June 7, 1932.  L. H. BRADBURN  1,861,906
TELESCOPIC COACH AND JACK
Filed May 31, 1929  2 Sheets-Sheet 1
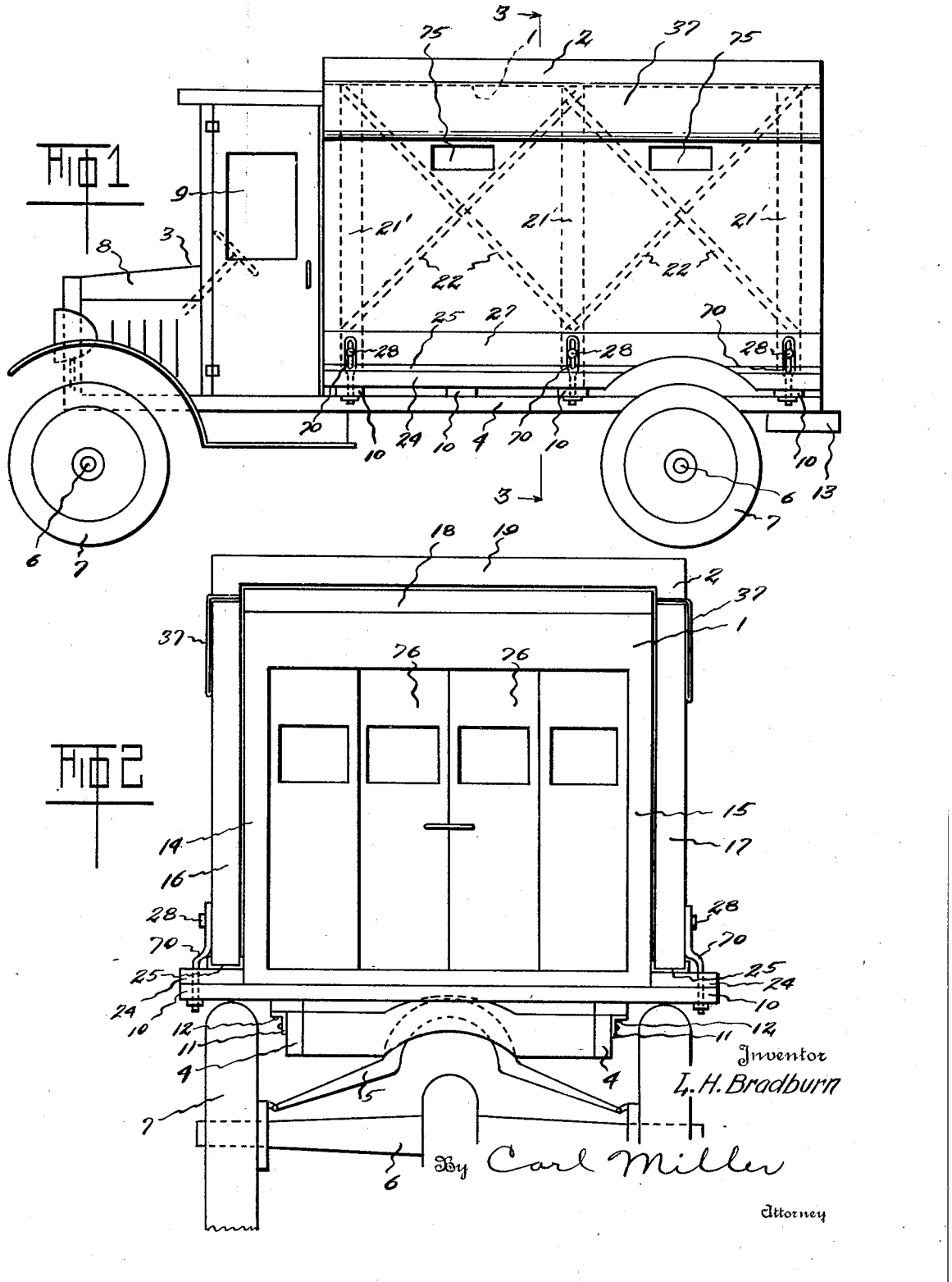

June 7, 1932. L. H. BRADBURN 1,861,906
TELESCOPIC COACH AND JACK
Filed May 31, 1929  2 Sheets-Sheet 2
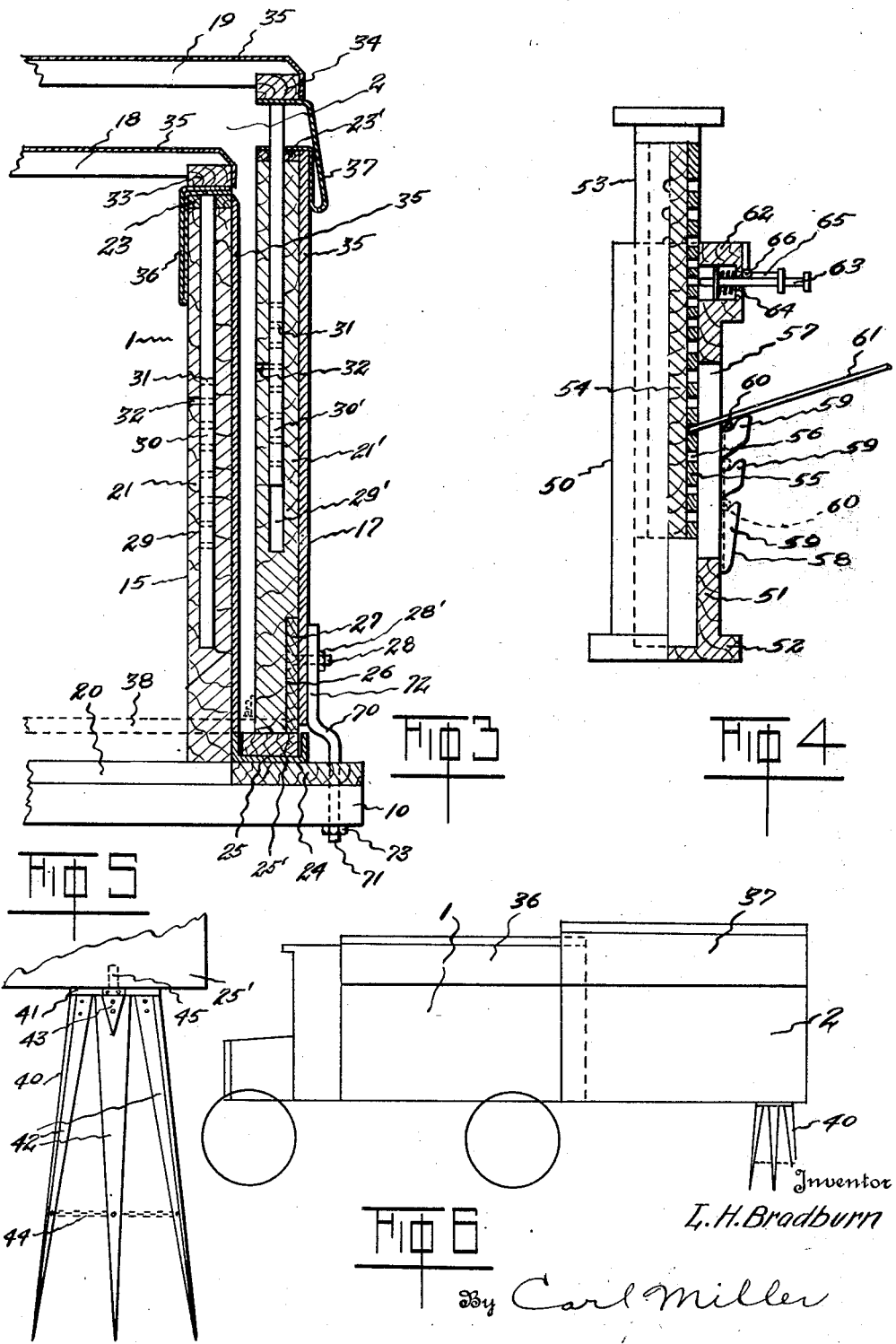
Inventor
L. H. Bradburn
By Carl Miller
Attorney Patented June 7, 1932

1,861,906

UNITED STATES PATENT OFFICE

LUMAN H. BRADBURN, OF EUREKA, MONTANA

TELESCOPIC COACH AND JACK

Application filed May 31, 1929. Serial No. 367,438.

This invention relates to an automobile body construction and more particularly to a telescopic coach wherein the automobile body is divided into two individual telescopic compartments adapted to be attached to the usual automobile chassis.

One of the objects of this invention is to provide a novel type of coach adapted to accommodate a relatively large family or number of people, comprising two individual compartments adapted to telescope within each other, the inner one being rigidly connected to the vehicle chassis while the other one is adapted to slide thereon relative to said first mentioned compartment in a rearwardly direction.

Another object of the invention is the provision of means whereby the roof or ceiling of each of said compartments may be raised to allow for plenty of head room when each of said compartments are in use, that is, disposed end to end.

A still further object of this invention is the provision of a novel form jack which is adapted to be used to raise the ceilings of the said compartments and which may also be used for any other purpose for which a jack is applicable.

An additional object of this invention is the provision of a tripod means for maintaining the outer compartment in a horizontal position when the same is suspended from the automobile chassis, and to rigidly support the outer end of said compartment, relative thereto.

Further objects of this invention will become apparent as the description thereof proceeds, reference being now had to the accompanying drawings wherein:—
Figure 1 is an elevational view of the automobile showing the telescopic compartments in travelling position.

Figure 2 is a rear elevational view of the same.
Figure 3 is a detail cross-sectional view of two of the side walls of the telescopic compartments taken on line 3—3, Figure 1, and looking in the direction of the arrows.

Figure 4 is an elevational view partly in section of the jack.

Figure 5 is an elevational view of one of the tripod members.

Figure 6 is a diagrammatic elevational view of the automobile with the telescopic compartments arranged end to end, when the same is to be parked over night, or for any length of time as when camping, etc.

The telescopic compartments 1 and 2 are mounted on the chassis of a conventional type of automobile 3, comprising two longitudinal frame members 4 suspended by means of transverse springs 5 on axles 6 which have mounted thereon wheels 7. Rigidly attached to the chassis of the automobile 3 directly to the rear of the hood 8 is a closed-in driving compartment or cab 9, said cab being of any conventional shape or design and secured to the chassis in any desired manner. Cross members 10 are arranged transversely with respect to the longitudinal frame members 4 and are rigidly secured thereto by means of the angle brackets 11 and rivets or bolts 12. A luggage carrier 13 is attached in any desired manner to the under surface of the frame members 4. It is to be understood that all of the above is conventional and is not part of my invention.

The body of the automobile comprises two telescopic compartments 1 and 2, the inner compartment 1 being rigidly secured to the chassis while the outer compartment 2 is slidably mounted thereon in a manner to be hereinafter described. The inner and outer compartments comprise respectively side walls 14 and 15, 16 and 17, and a roof or ceiling 18 and 19. The inner compartment 1 is provided with a flooring 20 which is rigidly secured to the chassis. The side walls of said compartments comprise vertically spaced posts 21 and 21' connected by means of the diagonal braces 22 and top brace cross members 23 and 23' to form a rigid structure. The posts 21 which form the side walls of the inner compartment 1 rest on the flooring 20 and are rigidly secured thereto. Mounted adjacent the outer surfaces of the posts 21 is a longitudinal channel supporting member 24 which is rigidly fastened to the ends of the cross-members 10. Seated on the member 24 and abutting the outer surfaces of the posts 21 is a longitudinal channel 25 which is the full length of the outer compartment 2 and which in turn is rigidly secured to the channel support member 24 and cross-members 10 in any desired manner. Fitted within the channel 25 and of a length substantially equal thereto is a sliding base member 25' to which is rigidly secured the lower ends of the posts 21'. Each of the posts 21' are recessed on their outer surface as at 26 to receive a longitudinal insert 27 which has mounted thereon an outwardly extending bolt 28, the purpose of which is to be hereinafter described.

Each of the vertical posts 21 and 21' have formed therein central vertical bores 29 and 29'. Fitted within said bores are pipe or rod members 30 and 30', provided with a plurality of transversely spaced openings 31. A similar opening 32 is arranged in each of said posts 21 and 21' to align with any one of the openings 31. The roofs 18 and 19 of the compartments 1 and 2 are fastened to longitudinal members 33 and 34 which are mounted and rigidly secured to the upper ends of the pipe or rod members 30. The top of the roofs 18 and 19 and the outer surfaces of the side walls of each of the compartments are covered by a sheathing 35 of fabric or any other suitable material. Secured to the under surface of the members 33 and 34, and to the top of the cross braces 23 and 23' on the side walls of each of the compartments are flexible collapsible wall portions 36 and 37 of canvas or any other suitable material which allow the roofs 18 and 19 to be raised and at the same time constituting an integral part of the side walls. In Figure 3, the flexible collapsible wall portion 37 comprising a part of the side wall 17, is shown partly extended and the roof 19 partly raised. To maintain the roof in its raised position a pin (not shown) may be inserted through the opening 32 in the vertical post 21' and into a corresponding aligned opening 31 in the pipe or rod member 30'. It is to be understood that the side walls 14 and 16 are similar in construction in all respects to the structure of the side walls 15 and 17, described above and shown in detail in Figure 3. The floor of the outer compartment 2 is composed of a plurality of removable floor boards 38, that are placed in position when said compartment is moved in its outermost position shown in Figure 6, said boards being placed across the sliding base members 25' and secured thereto in any desired manner.

To support the outer compartment 2 when it is slid out into the position shown in Figure 6 a pair of tripods 40 are provided. Each of said tripods comprise a base 41, and three legs 42, connected to said base by means of hinges 43. To prevent undue separation of the legs 42, and collapse of the tripods, said legs are connected by chains 44. Positioned centrally on the base 41 and extending upwardly therefrom is a lug 45, that is adapted to fit in a corresponding hole in the outermost end of the sliding base member 25', to securely lock the tripod in place.

To raise each of the roofs 18 and 19, a jack 50 is provided, said jack being adapted to be positioned centrally beneath one of said roofs (preferably the outer one first, when the compartments are positioned as shown in Figure 6), and supported in any convenient manner, so that operation of the jack will cause the roof to be raised to the desired position when the roof may be locked in position by inserting a suitable pin through the holes 32 and 31. The roof 18 on the inner compartment may then be raised in a similar manner. The jack 50 comprises a hollow standard 51 of wood having a base 52, said standard 51 being open at the top to receive therein a plunger 53. The plunger 53 comprises a central wooden member 54 of square cross-section having a metal sleeve 55 secured thereto, said sleeve being provided with a plurality of spaced openings 56. A slot 57 is formed on one of the walls of the standard 51, intermediate the ends thereof, the holes or openings 56 being in alignment with said slot. Attached to each side of the slot 57 on the standard 51 is a bracket 58 provided with a plurality of shelves or recesses 59 adapted to support a pin 60. The pin 60 serves as a fulcrum for a lever 61 which is adapted to engage any selected opening 56. Pressure applied on the lever 61 to move the same downwardly will cause the plunger 53 of the jack 50 to raise. To lock the plunger in any desired raised position, the standard 51 is provided adjacent its upper edge with a chamber 62 in which a sliding pin 63 is mounted. Fitted within the chamber 62 and engaging an abutment or the sliding pin 63 is a compression coil spring 64 tending to move said pin inwardly to engage one of the openings 56 that might be in alignment therewith. To control the movement of the sliding pin 63 a lock member 65 is provided and pivotally connected as at 66 to the chamber 62, said lock member being adapted to engage an outer abutment or the sliding pin 63. Thus, when the plunger 53 of the jack is raised to its desired position, manual movement of the lock member 65 upwardly will cause the sliding pin 63 to move inwardly under the action of the spring 64 and engage one of the openings 56. To release the jack all that is necessary is to pull out the pin 63 whereby the plunger 53 will move downwardly under the action of gravity. It is obvious that the same jack may be employed for other purposes, if so desired, and that additional holes 56, slots 57 and brackets 58 may be provided on the other three sides of the jack.

When the compartments 1 and 2 are positioned in telescopic relation with each other, a locking means for the outer compartment is provided so that the same is prevented from moving while the vehicle is travelling. This locking means comprises a plurality of slotted bolts 70 of ogee curvature as shown in Figure 3, the threaded ends 71 of which are adapted to extend through suitable openings in the cross-members 10 and channel support 24. The slotted parts 72 of the bolts 70 are adapted to fit over the extended ends of the bolts 28 (Figure 3) and are locked in place by the nuts 28'. A nut 73 locks the bolt 70 in place with respect to the cross-members 10.

It is therefore apparent that to permit the outer compartment 2 to slide outwardly the bolts 70 are first removed which as shown in Figure 3 is a relatively simple procedure.

Each of the compartments 1 and 2 are provided with side windows 75. The rear of the inner compartment 1 is provided with sliding door 76, while the end or rear of the outer compartment may be closed either by swing doors or a curtain (not shown).

While the described disclosure is a preferred embodiment of my invention it is apparent that various modifications of the same may be resorted to if desired within the scope of the appended claim.

I claim:—

In a vehicle, a rigid body, a telescopic body to slide over said rigid body, a roof on said rigid body, hollow posts along the sides of said rigid body, rods supporting said roof telescoping vertically in said hollow posts, similar hollow posts on said telescopic body, a roof for said telescopic body, rods supporting the roof of said telescoping body, said rods telescoping vertically in the hollow posts of said telescopic body, said second roof being supported over the roof of the rigid body when the bodies are in retracted position, means for slidably supporting the walls of said telescopic body outside the walls of said rigid body, whereby said vehicle body may be extended both rearwardly and vertically or vertically and rearwardly alone.

In testimony whereof I affix my signature.

LUMAN H. BRADBURN.